United States Patent [19]
Miller

[11] Patent Number: 6,128,736
[45] Date of Patent: Oct. 3, 2000

[54] METHOD FOR INSERTING A WATERMARK SIGNAL INTO DATA

[75] Inventor: Matthew L. Miller, Princeton, N.J.

[73] Assignee: Signafy, Inc., Princeton, N.J.

[21] Appl. No.: 09/215,958

[22] Filed: Dec. 18, 1998

[51] Int. Cl.[7] .............................. H04L 9/00; G09C 3/00; G09C 5/00
[52] U.S. Cl. ............................................. 713/176; 380/54
[58] Field of Search ....................... 380/54, 22; 713/100, 713/176; 382/100, 232

[56] References Cited

U.S. PATENT DOCUMENTS

| | | | |
|---|---|---|---|
| 5,659,726 | 8/1997 | Sandford, III et al. | 707/101 |
| 5,664,018 | 9/1997 | Leighton | 380/54 |
| 5,687,236 | 11/1997 | Moskowitz et al. | 380/28 |
| 5,721,788 | 2/1998 | Powell et al. | 382/100 |
| 5,825,892 | 10/1998 | Braudaway et al. | 380/51 |
| 5,875,249 | 2/1999 | Mintzer et al. | 380/54 |
| 5,889,868 | 3/1999 | Moskowitz et al. | 380/51 |

OTHER PUBLICATIONS

Mitchell D. Swanson, et al., Multi–Resolution Scene–Based Video Watermarking Using Perceptual Models, IEEE Journal on Selected Areas in Communications, vol. 16, No. 4, pp. 540–550, May 1998.

*Primary Examiner*—Gail O. Hayes
*Assistant Examiner*—Bryan Latham
*Attorney, Agent, or Firm*—Scully, Scott, Murphy & Presser

[57] ABSTRACT

A method for inserting a watermark signal into data to be watermarked. The method includes the steps of: applying a partial watermark extraction to unwatermarked data for generating a first set of intermediate extracted values; identifying a first set of target values that are to replace the intermediate extracted values; computing the difference between the first set of target values and the first set of intermediate extracted values; and adding the computed difference throughout the unwatermarked data. In a preferred embodiment of the method of the present invention, the step of identifying a first set of target values that are to replace the intermediate extracted values further includes the substeps of: applying a transform to the first set of intermediate extracted values; applying a further partial watermark extraction to the transformed first set of intermediate extracted values to obtain a second set of intermediate extracted values; identifying a second set of target values that are to replace the second set of intermediate extracted values; computing the difference between the second set of target values and the second set of intermediate extracted values; adding the computed difference throughout the transformed first set of intermediate extracted values to obtain a transformed first set of target values; and applying an inverse transform to the first set of transformed target values to obtain the first set of target values.

32 Claims, 3 Drawing Sheets

| a | b | c | l | a | b | k | l | a |
|---|---|---|---|---|---|---|---|---|
| l | k | d | k | j | c | j | i | b |
| i | j | e | h | i | d | g | h | c |
| h | g | f | g | f | e | f | e | d |
| j | k | l | i | j | k | h | i | j |
| i | h | a | h | g | l | g | f | k |
| f | g | b | e | f | a | d | e | l |
| e | d | c | d | c | b | c | b | a |

Fig. 2

METHOD FOR INSERTING A WATERMARK SIGNAL INTO DATA

BACKGROUND OF THE INVENTION

1. Field of the Invention

The present invention relates generally to preventing unlawful copying of audio, video and other media that can be digitized and, more particularly, to a method for inserting a watermark into digitized data.

2. Prior Art

U.S. patent application Ser. No. 09/118,467, which is incorporated herein by its reference, describes a method for detecting watermarks in which a block DCT transform is applied to an image and then selected terms of the resulting block DCTs are summed to obtain a vector of values. This vector is then compared against an encoded watermark signal to determine whether that watermark has been inserted into the image. The corresponding watermark insertion algorithm, also described in U.S. patent application Ser. No. 09/118,467, proceeds by first summing the same block DCT terms to determine the vector already present in the image. This vector is random if the image has not been watermarked earlier. The inserter then chooses a new vector that resembles the original noise vector, but has a high correlation with the desired watermark signal. Next, it distributes the difference between the new vector and the old vector throughout the block DCT terms according to the relative sensitivity of the eye to changes in those terms. That is, large fractions of the difference are added to terms to which the eye is insensitive, while smaller fractions are added to the terms to which the eye is more sensitive. Finally, the inverse block DCT transform is taken to obtain a watermarked image.

The choice of using the block DCT transform in the preferred implementation of U.S. patent application Ser. No. 09/118,467 was made for several reasons. The primary reason is that the DCT is the transform used in MPEG video compression and JPEG still image compression. Thus, employing it for watermarking allows rapid watermark detection compressed data. A secondary, but more fundamental, reason is that block DCTs are a fast way to separate low frequency data (which is robust to most image transformations) from high frequencies (which is more fragile).

However, block DCTs, or any block-based transforms, are not a good representation for the perceptual modeling required during insertion. Perceptual models based on block transforms tend to ignore the interaction between noise added to neighboring blocks, resulting in a type of "blocking artifact," such as that visible in highly compressed MPEG and JPEG images. These same artifacts are also visible in images that have been too strongly watermarked by the insertion method of U.S. patent application Ser. No. 09/118,467.

The present invention improves on the insertion method of U.S. patent application Ser. No. 09/118,467 by allowing the image noise to be distributed according to a perceptual model based on more appropriate image representations, such as pixels or wavelets, while still generating a watermark detectable by a DCT-based detection method. It, thus, achieves higher image fidelity than the earlier insertion algorithm, while maintaining the advantages of block DCTs for speed, frequency separation and relationship to compression algorithms.

SUMMARY OF THE INVENTION

Therefore, it is an object of the present invention to provide a method for inserting a watermark signal into data which lessens or eliminates the deficiencies associated with prior art watermark insertion methods.

It is a further object of the present invention to provide a method for inserting a watermark signal into data which allows image noise to be distributed according to a perceptual model based on more appropriate image representations, such as pixels or wavelets, while still generating a watermark detectable by a DCT-based watermark detection method.

It is yet a further object of the present invention to provide a method for inserting a watermark signal into data which achieves higher image fidelity than watermark insertion methods of the prior art, while maintaining the advantages of block DCTs for speed, frequency separation and relationship to compression algorithms.

Accordingly, in the method of the present invention, watermarks are inserted by a two-layered process, a lower layer and an upper layer. The lower layer resembles the insertion method of U.S. patent application Ser. No. 09/118,467, except that it (a) operates on an intermediate array of averaged blocks, instead of the whole image; and (b) uses a simpler perceptual model. In the upper layer, the changes made by the lower layer to the intermediate array of averaged blocks are distributed through the image according to a perceptual model computed on the most appropriate image representation, such as pixels or wavelets.

More specifically, the method for inserting a watermark signal into data to be watermarked comprises the steps of: applying a partial watermark extraction to unwatermarked data for generating a first set of intermediate extracted values; identifying a first set of target values that are to replace the intermediate extracted values; computing the difference between the first set of target values and the first set of intermediate extracted values; and adding the computed difference throughout the unwatermarked data.

In a preferred embodiment of the method of the present invention, the step of identifying a first set of target values that are to replace the intermediate extracted values further comprises the substeps of: applying a transform to the first set of intermediate extracted values; applying a further partial watermark extraction to the transformed first set of intermediate extracted values to obtain a second set of intermediate extracted values; identifying a second set of target values that are to replace the second set of intermediate extracted values; computing the difference between the second set of target values and the second set of intermediate extracted values; adding the computed difference throughout the transformed first set of intermediate extracted values to obtain a transformed first set of target values; and applying an inverse transform to the first set of transformed target values to obtain the first set of target values.

BRIEF DESCRIPTION OF THE DRAWINGS

These and other features, aspects, and advantages of the methods of the present invention will become better understood with regard to the following description, appended claims, and accompanying drawings where:

FIG. 2 shows the manner in which images are divided into M×N blocks and accumulated in the upper layer.

DETAILED DESCRIPTION OF THE PREFERRED EMBODIMENT

Although this invention is applicable to numerous and various types of digitized data, it has been found particularly useful in the environment of digital image data. Therefore, without limiting the applicability of the invention to digital image data, the invention will be described in such environment.

Figure 1:
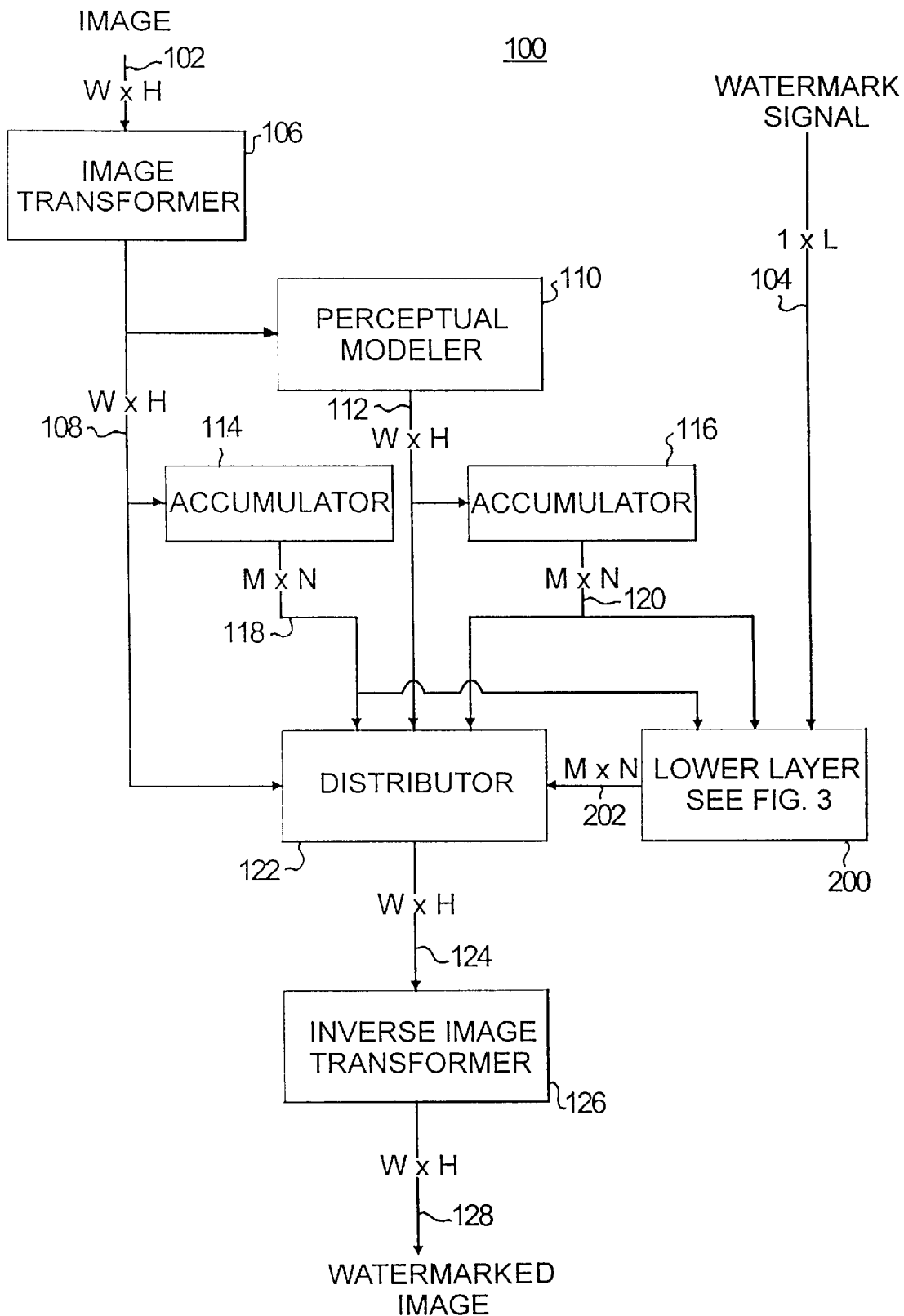
FIG. 1 shows a data-flow diagram of the upper layer of a preferred embodiment of the watermark insertion method of the present invention.

Referring now to FIG. 1, the upper layer of the insertion algorithm is illustrated and generally referred to by reference numeral 100. In the upper layer 100 two inputs 102, 104 are taken. The first input 102 being the image to be watermarked and the second input 104 being the watermark signal to be inserted.

The image can be represented in any form that can be transformed into the form most appropriate for perceptual modeling. This transformation is performed in the image transformer 106. In the preferred implementation, the image representation that is output by the image transformer is a W×H array of pixel intensities. However, this may be replaced by any representation that has the following property: if the image is converted to a pixel representation, divide the image into M×N blocks, sum all those blocks together, and then convert the resulting accumulated M×N array into the representation in question, the result will be the same as if the image is converted into the representation in question before dividing into M×N blocks and summing. Put more succinctly, the transform of the sum is equal to the sum of the transforms. This property is found in several types of image representations that may be useful for implementing the present invention, such as DCT, block DCT, FFT, block FFT, wavelets, Hadamard transforms and Cortex transforms.

The watermark signal 104 is represented as a length-L vector (1×L) of values. This is the signal that one would wish the watermarked version of the image to yield when a watermark extraction process, such as that disclosed in U.S. patent application Ser. No. 09/118,467, is applied to The output 108 of the image transformer 106, henceforth referred to simply as the "image," is sent first to perceptual modeler 110. This computes a W×H array of "slack," 112 each of which approximates a relative insensitivity of the human eye to changes in the corresponding element of the image. Thus, in the preferred implementation, each element of this slack array 112 corresponds to a pixel. A large value in the slack array 112 indicates that the eye is very tolerant of changes in that pixel, while a small value indicates the eye is very sensitive to changes in that pixel. The slack is based on the brightness of the pixel, as well as the context in which it appears. Several methods known in the art exist for computing such slack values and hence will not be described herein. In the preferred implementation, a simple model is used in which the slack is computed from the pixel brightness and from the standard deviation of brightness in a small neighborhood around the pixel.

The following pseudocode describes the preferred, upper-level perceptual modeler algorithm in detail:

I[i,j]=intensity of pixel i,j in image (real values ranging between 0 and 1)

Ka=constant that controls the level of texture which yields half the maximum visual masking Kb=constant that controls how quickly the amount of visual masking increases as texture increases Kc=constant that controls the minimum amount of masking from texture (between 0 and 1)

Kd=constant that controls the rate at which visual masking increases as intensity increases Ke=constant that controls the minimum amount of masking from intensity (between 0 and 1)

For each pixel, i,j

```
{
    v = variance of a neighborhood of pixels around
        pixel i,j
    t = Kc + (1 − Kc) / (1 + exp( (Ka − v) / Kb ))
    b = Ke + (1 − Ke) * I[i,j] ˆ Kd
    Sp[i,j] = b * t
}
```
Sp[i,j] is now the slack for pixel i,j.

The image 108 and the slack array 112 are now sent to a pair of accumulators 114 and 116. Both of these accumulators 114, 116 work identically, each dividing its respective input array into M×N blocks, and then summing the blocks to obtain a single, accumulated M×N array 118, 120 for accumulators 114 and 116 respectively. The division into M×N blocks need not be made in a rectilinear grid, so long as it is identical for both the image array 108 and the slack array 112, and corresponds to the summation pattern used in the watermark detector used. An example of a summation pattern is illustrated in FIG. 2.

The following pseudocode describes the accumulator functions in detail:

D[i,j]=element i,j of array of data to be accumulated (pixel or pixel slack)

M=number of rows in accumulated array

N=number of columns in accumulated array

Km[i,j]=constant giving row of accumulated array that D[i,j] must be added into

Kn[i,i]=constant giving column of accumulated array that D[i,j] must be added into (that is, Km[ ] and Kn[ ] define the pattern with which the data should be accumulated)

Let A[1. . . M,1. . . N]=0

For each element, i,j of D[ ]

```
{
    m = Km[i,j]
    n = Kn[i,j]
    A[m,n] = A[m,n] + D[i,j]
}
```

A[m,n] is now element m,n of the M×N accumulated array

The outputs 118, 120 of accumulators 114 and 116, respectively, are then sent, along with the watermark signal 104, to the lower layer 200 of the watermark insertion method of the present invention. This produces a new M×N array 202, which is a "watermarked" version of the M×N accumulated image array 108; "watermarked" in the sense that, if the finished, watermarked image is sent through an accumulator again, the result will be this new array.

In the penultimate step, the image 108 obtained from the image transformer 106, the M×N accumulated image 118 Obtained from accumulator 114, the slack array 112 obtained from the perceptual modeler 110, the M×N accumulated slack array 118 obtained from the accumulator 114, and the M×N new array 202 obtained from the lower layer 200 are all sent to the distributor 122. This subtracts the accumulated image data from the new array 202 to determine how much each element of the accumulated image data must be increased or decreased in order to change the image 102 into a watermarked image 128. These changes are then distributed throughout the image proportionally according to the pixel slacks and results in a W×H array 124. The function of distributor is given in detail in the following pseudocode:

D[i,j]=pixel i,j in image

Ad[m,n]=value m,n accumulated from D[ ]

S[i,j]=perceptual slack for pixel i,j of D[ ]

As[m,n]=value m,n accumulated from S[ ]

New[m,n]=element m,n of new array to be distributed into D[ ]

Ka=constant maximum allowable value for any element of D[ ]

Kb=constant minimum allowable value for any element of D[ ]

Km[i,j]=constant giving row of accumulated array that D[i,j] must be added into (same as array in accumulator pseudocode)

Kn[i,j]=constant giving column of accumulated array that D[i,j] must be added into (same as array in accumulator pseudocode)

For each element, i,j of D[ ]

```
{
    m = Km[i,j]
    n = Kn[i,j]
    If Ad[m,n] ! = New[m,n] and As[m,n] > 0
    {
        v = D[i,j] + (New[m,n] − Ad[m,n]) * S[i,j] /
            As [m,n]
        If v > Ka
        {
            v = Ka
        }
        If v < Kb
        {
            v = Kb
        }
        Ad[m,n] = Ad[m,n] − D[i,j] + v
        As[m,n] = As[m,n] − S[i,j]
        D[i,j] = v
    }
}
```

Alternatively, the changes can be distributed according to how they might be affected by attacks, in addition to how they affect fidelity. Finally, the inverse image transformer 126 transforms the image back into the same representation it was received in. The output of the inverse image transformer 126 is the finished, watermarked image 128.

Figure 3:
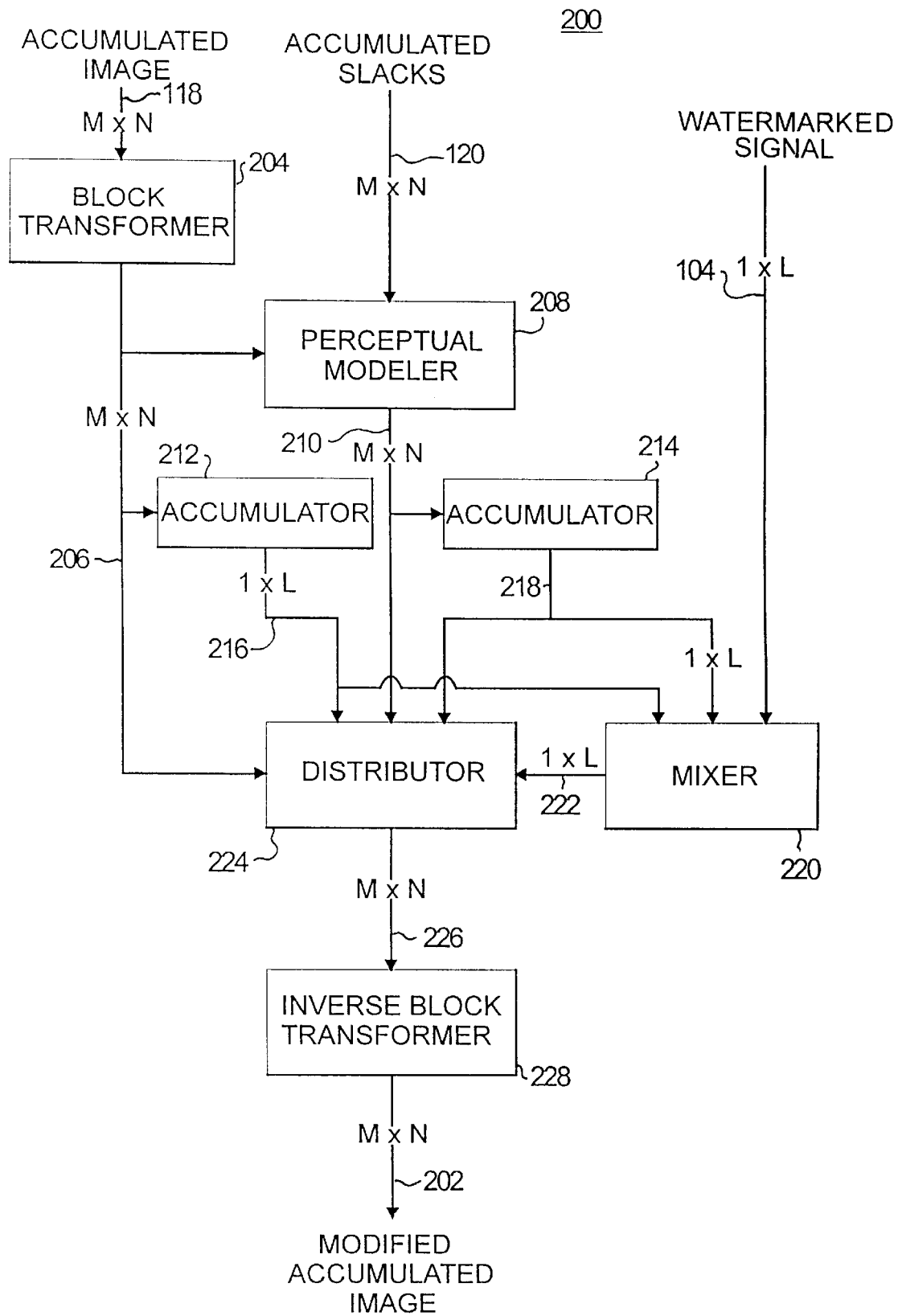
FIG. 3 shows a data-flow diagram of the lower layer of a preferred embodiment of the watermark insertion method of the present invention.

Referring now to FIG. 3, there is illustrated the lower layer 200 of the method of the present invention, which is very similar to the upper layer 100. The lower layer 200 has three inputs 118, 120, and 104 obtained from the upper layer 100, namely, the accumulated image data 118, the accumulated image slacks 120 and the watermark signal 104.

The accumulated image data 118 is first sent through block transformer 204, which transforms it into the same representation that will be used by the watermark detector. Although block-based transforms are referred to, which necessitate the present invention because of the inappropriateness of such transforms for perceptual modeling, the invention might just as well be used with a non-block based, invertible transform. The invention would deliver an improvement if this other transform is unsuitable for perceptual modeling for any reason. In the preferred implementation, the block transformer 204 divides its input data into 8×8 blocks and computes the DCTs of each of them. Alternatives to this block DCT transform include the full DCT, FFT, M×N block FFT, wavelets, Hadamard transforms and Cortex transforms.

The output 206 of block transformer 204 is first sent to the perceptual modeler 208, along with the accumulated slack data 120 given by the upper layer 100. The perceptual modeler 208 then computes an M×N array of slacks 210 for the block transformed, accumulated image data, much as the upper layer's perceptual modeler 110 did for the whole image 108. Of course, the lower layer's 100 perceptual modeler is more difficult to efficiently implement because its input 120, 206 is inappropriate for perceptual modeling, but it is nevertheless often possible to design a less-than-perfect modeler 208 for use with the lower layer 200. The imperfections of the modeler 208 will be overcome by the better modeler 110 of the upper layer 100. Furthermore, the modeler 208 of the lower layer 200 can make use of the accumulated output 210 of the modeler 208 of the lower layer 200 to improve its slack estimates. In the preferred implementation, the modeler 110 of the lower layer 100 finds the average, accumulated pixel slack for each 8×8 block and multiplies it by constant slack values for the 64 terms of the 8×8 DCT. More sophisticated models are possible, as are known in the art, but are not needed.

The following pseudocode describes the function of the preferred, lower level perceptual modeler in detail:

D[m,n]=term m,n of 8×8 block DCT of data

Asp[m,n]=value m,n in accumulated array of pixel slacks (Sp[ ])

Ka[r,c]=constant giving the perceptual slack for term m,n of an 8×8 DCT

For each 8×8 block DCT, D[m0. . . m0+8,n0. . . n0+8]

```
{
    s = average of values in Asp[m0 . . . m0+8,n0 . . . n0+8]
    For each term, r,c in an 8 x 8 block
    {
        Sd[m0+r,n0+c] = Ka[r,c] * s
    }
}
```

Sd [m,n] is now the slack for D[m,n]

The outputs 206, 210 of block transformer 204 and perceptual modeler 208 are then sent to two accumulators 212 and 214. These accumulators 212, 214 are similar to the accumulators 114, 116 used in the upper layer 100, except that they accumulate in a different pattern. The pattern used in the lower layer 200 is the one employed in the final phase of the watermark detector used. The output 216, 218 of each accumulator 212, 214 respectively, is a vector of length L (which is the same length as the watermark signal 104), where each of its elements is the sum of a subset of the terms of the accumulator's 212, 214 input 206, 210, respectively. In the preferred implementation, only mid-frequency terms of the 8×8 DCTs are used in this summation. The DC terms are ignored because the human eye is very sensitive to changes in them, and the high frequencies are ignored because they are very susceptible to attacks on the image such as low-pass filtering.

In pseudocode, the function of the lower layer accumulators is nearly identical to that of the upper layer:

Ad[m,n]=element m,n of array of data to be accumulated (DCT team or DCT slack)

L=length of accumulated vector

Kk[m,n]=constant indicating which element of the accumulated vector Ad[m,n] must be added into (=−1 if Ad[m,n] should be ignored because it's either a DC term or a high frequency)

Let V[1...L]=0
For each element, m, n of Ad[ ]

```
{
    If Kk[m,n] ! = −1
    {
        k = Kk[m,n]
        V[k] = V[k] + Ad[m,n]
    }
}
```

V[k] is now element 1 of the accumulated vector

The output 216, 218 of accumulators 212 and 214, respectively, together with the watermark signal 104 acquired as input, are sent to mixer 220. The mixer 220 performs an analogous function for the lower layer 200 to that performed by the whole lower layer 200 for the upper layer 100. Namely, it produces a new vector 222 of L values that should replace the vector accumulated from the block transformer's 204 output 206. The problem that the mixer 220 must solve is that of finding a vector 222 which (a) has a high correlation coefficient with the desired watermark vector 104; (b) will still have a high correlation with the watermark vector 104 even after some noise has been added to it; and (c) can be inserted into the image 102 with minimal perceptual change.

The correlation coefficient that will be obtained after a given amount of normally distributed, zero-mean noise has been added to the new vector can be computed as follows:

w'=w−mean (w)

u'=u−mean (u)

Ec=w'.(u'+r)/sqrt(w'.w'*(u'+r).(u'+r))  =(w'.u'+w'.r)/sqrt(w'.w'*(u'.(u'+2u'.r+r.r))

where r is the noise vector added, w is the watermark vector 104, u is the new vector 222, and Ec is the expected correlation. On average, w'.r and u'.r will be 0, and r.r will be the standard deviation of the noise, Sn, such that:

Ec=w'.u'/squrt(w'.w'*(u'.u'+Sn))

The perceptual change required to insert a given vector can be estimated by computing the distance from that vector to the accumulated data from the unwatermarked image 102, weighted by the accumulated slacks 120. In the preferred implementation, A.B. Watson (1993) "DCT Quantization Matrices Usually Optimized for Indirect Images" SPIE 1913: 202–216 is followed in using L4 distance for this computation. Thus:

$$J=\text{sum}(((u-v)/s)^4)^{\wedge}0.25$$

Where u is the new vector 222, v is the old vector 206 (accumulated output of the block transformer) and s is the accumulated slacks 120.

In the preferred implementation, the problem of finding an optimal new vector 222 is simplified by assuming that this vector will lie in the plane described by the origin of the space, the watermark vector, w, and the old vector, v. Thus, the new vector 222 can be expressed as a weighted sum of the watermark vector and the old vector:

$$u=\text{alpha}*w+\text{beta}*v$$

This reduces the mixer's problem to that of finding the best alpha and beta.

Several approaches to finding u are possible. One might specify a fixed correlation, Ec, for a given amount of noise, Sn, and try to minimize J. Alternatively, one might specify J and Sn, and try to maximize Ec, etc. In the preferred implementation, a combination of these approaches have been chosen. The user specifies a desired Ec (preferably this is the threshold that will be used during detection), a desired Sn (preferably this reflects the amount of noise the user expects the watermark to be subjected to as the image is degraded by transmission and modification), a minimum Sn (preferably this reflects the absolute minimum noise the watermark might be subjected to, such as that resulting from quantization error when the image is stored in integer form), and a maximum allowable perceptual distance. The mixer first tries to minimize J, using the desired values of Ec and Sn. If the resulting J is greater than the maximum allowable distance, the mixer then tries to reduce J by using lower values of Sn. If J is still too large, even when Sn is at the given minimum, the mixer reduces Ec until J is acceptable.

To realize the above-described, preferred mixer algorithm, extensive use of searching is made use of. First, a gradient descent search is performed, where beta is varied to find the minimum possible J. During this search, the value of alpha needs to be computed such that the following equations are satisfied:

$$u\text{alpha}*w+\text{beta}*v$$

$$Ec=w'.u/\text{sqrt}(w'.w'^*(u'.u'+L\ Sn))$$

For a given Ec, Sn and beta (where L is the number of elements in w), it is a simple matter to derive the correct alpha algebraically:

$$\text{alpha}=(Ec/(1-Ec^{\wedge}2))^* \text{sqrt}((v'.v'-(w'.v')^{\wedge}2)\ \text{beta}\ ^{\wedge}2 +L\ Sn^{\wedge}2)-(w'.v')\ \text{beta}$$

When it is found that the resulting J is too large, successive binary searches are performed, first on lower values of Sn, and then on lower values of Ec. Within each iteration of these searches, the gradient descent search is again performed to find the best alpha and beta for the new Ec and Sn. In pseudocode:

V[k]=value k accumulated from input data s[k]=value k accumulated from perceptual slack W[m,n]=desired watermark signal Ka=desired amount of normal noise that wmk should survive Kb=minimum amount of normal noise that wmk must survive (amount expected from quantization errors)

Kc=desired expected correlation coefficient between W[ ] and mixed signal+normal noise with variance Ka Kd=maximum perceptual distance between V[ ] and mixed signal Ke=constant controlling precesion with which mixture is made Use gradient descent to find the value of Beta that minimizes J, computed as follows:

```
Alpha = (Kc / (1 - Kc^2))*
        sqrt ((V . V − (W . V)^2) Beta^2 + L Ka2)−
        (W . V) Beta
U[. . .] = Alpha * W[. . .] + Beta * V[. . .]
J = sum (((V[. . .] − U[. . .]) / s[. . .])^4) (1/4)
If J > Kd
{
    /*Here we use a binary search to reduce the amount
    of noise that the watermark will survive*/
    High = Ka
    Low = Kb
```

```
-continued

While High - Low > Ke
{
    T = (High - Low) / 2
    Use gradient descent to find the value of
    Beta that minimizes J, computed as follows:
        Alpha = (Kc / (1 - Kc^2))*
            sqrt ((V . V - (W . V)^2) Beta^2 + L
T 2) -
            (W . V) Beta
        U[. . .] = Alpha * W[. . .] + Beta * V[. . .]
        J = sum(((V[. . .] - U[. . .]) /
            s[. . .])^4)^(1/4)
    If J > Kd
    {
        High = T
    }
    else
    {
        Low = T
    }
}
}
If J > Kd
{
    /*Here we use a binary search to reduce the desired
    expected correlation coefficient*/
    High = Kc
    Low = 0
    While High - Low > Ke
    {
        T = (High - Low)/2
        Use gradient descent to find the value of Beta
        that minimizes J, computed as follows:
            Alpha = (T / (1 - T^2))*
                sqrt ((V . V - (W . V)^2) Beta^2 +
                L Ka^2)-(W . V) Beta
            U[. . .] = Alpha * W[. . .] + Beta * V[. . .]
            J = sum (((V[. . .] - U[. . .]) /
                s[. . .])^4)^(1/4)
        If J > Kd
        {
            High = T
        }
        else
        {
            Low = T
        }
    }
}
```

U[. . .]=Alpha*W[. . .]+Beta *V[. . .]
U is now the new vector to be inserted into the image In the penultimate step of the lower layer 200, the outputs 206, 216, 218, 210, 222 of block transformer 204, accumulators 212 and 214, perceptual modeler 208 and mixer 220, respectively, are all sent to distributor 224. The distributor 224 of the lower layer 200 works in an identical manner to the distributor 122 of the upper layer 100 to distribute the changes required to inserting vector 222 into the data 206 from the block transformer 204.

In pseudocode:

D[m,n]=element m,n of array that new signal is to be distributed into

V[k]=value k accumulated from D[ ]

S[m,n]=perceptual slack for element m,n of D[ ]

s[k]=value k accumulated from S[ ]

U[k]=element k of new signal to be distributed into D[ ]

Ka=constant maximum allowable value for any element of D[ ]

Kb=constant minimum allowable value for any element of D[ ]

Kk[m,n]=constant indicating which element of the accumulated vector Ad[m,n] must be added into (=−1 if Ad[m,n] should be ignored because it's either a DC term or a high frequency)

For each element, m,n of D[ ]

```
{
    If Kk[m,n] > -1
    {
        k = Kk[m,n]
        If V[k] ! = U[k] and s[k] > 0
        {
            v = D[m,n] + (U[k] - Ad[k]) * S[m,n] /
                s [k]
            If v > Ka
            {
                v = Ka
            }
            If v < Kb
            {
                v = Kb
            }
            V[k] = v[k] - D[m,n] + v
            s[k] = s[k] - S[m,n]
            D[m,n] = v
        }
    }
}
```

Alternatively, the changes can be distributed according to how they might be affected by attacks, in addition to how they affect fidelity. Finally, the output 226 of the distributor 224 is sent to an inverse block transformer 228, which performs the inverse of the transform performed by the block transformer 204 to obtain the new M×N array 202 of data that the upper layer 100 will distribute into the whole image at distributor 122.

It should be apparent to someone of ordinary skill in the art that the present invention can also be applied to media other than images, such as audio or video without departing from the spirit or scope of the invention. Whenever a watermark detection method is used in which watermarks can be extracted from the summed blocks of a piece of media, and in which the representation used for that extraction process is not the best one for perceptual modeling, an improved insertion method can be created by employing the two-layer method of the present invention.

Similarly, it should be apparent to one of ordinary skill in the art that the present invention is not limited to the representations used in the preferred implementation (pixels and block DCTs), but may be employed with any pair of representations.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for inserting a watermark signal into unwatermarked data, the watermark signal being extracted by application of a given watermark extraction process, the method comprising the steps of:

(a) applying a part of the watermark extraction process to the unwatermarked data for generating a first set of intermediate extracted values;

(b) identifying a first set of target values that are to replace the intermediate extracted values by;

(i) applying a transform to the first set of intermediate extracted values;

(ii) applying a further part of the watermark extraction process to the transformed first set of intermediate extracted values to obtain a second set of intermediate extracted values;

(iii) identifying a second set of target values that are to replace the second set of intermediate extracted values;

(iv) computing the difference between the second set of target values and the second set of intermediate extracted values;

(v) adding the computed difference throughout the transformed first set of intermediate extracted values to obtain a transformed first set of target values; and (vi) applying an inverse transform to the first set of transformed target values to obtain the first set of target values;

(c) computing the difference between the first set of target values and the first set of intermediate extracted values; and (d) adding the computed difference throughout the unwatermarked data.

2. The method of claim 1, wherein the unwatermarked data represents an audio signal.

3. The method of claim 1, wherein the first set of intermediate extracted values is smaller than the unwatermarked data.

4. The method of claim 3, wherein the first set of intermediate extracted values is obtained by averaging subsets of the unwatermarked data.

5. The method of claim 1, wherein the unwatermarked data represents an image.

6. The method of claim 1, wherein the unwatermarked data represents a video signal.

7. The method of claim 1, wherein step (d) comprises distributing the computed difference according to a perceptual model of human visual sensitivity.

8. The method of claim 1, wherein step (d) comprises distributing the computed difference according to how affected the data will be to a predetermined attack so that the attack will not affect the watermarked data.

9. The method of claim 1, wherein the data to be watermarked is represented in a spatial domain.

10. The method of claim 1, wherein the unwatermarked data represents an audio signal.

11. The method of claim 1, wherein the data to be watermarked is represented in a transformed domain.

12. The method of claim 11, wherein the transformed domain is selected from a group consisting of DCT, block DCT, FFT, block FFT, wavelet, Hadamard transform, Cortex transform.

13. The method of claim 1, wherein step (b) is performed such that the first set of target values maximizes a measure of robust match with the watermark signal.

14. The method of claim 13, wherein the measure of robust match is determined according to the equations:

$$w'=w-\mathrm{mean}(w)$$

$$u'=u-\mathrm{mean}(u)$$

$$Ec=w'.u'/\mathrm{sqrt}(w'.w'*(u'.u'+Sn))$$

where x.y indicates the inner product of vectors x and y, w is the watermark signal, u is the first set of target values, Sn is expected noise, and Ec is expected correlation.

15. The method of claim 4, wherein the second set of intermediate extracted values is smaller than the first set of intermediate extracted values.

16. The method of claim 15, wherein the second set of intermediate extracted values is obtained by averaging subsets of the first set of intermediate extracted values.

17. The method of claim 1, wherein the unwatermarked data represents an image.

18. The method of claim 1, wherein the unwatermarked data represents a video signal.

19. The method of claim 1, wherein step (v) comprises distributing the computed difference according to a perceptual model of human visual sensitivity.

20. The method of claim 1, wherein step (v) comprises distributing the computed difference according to how affected the data will be to a predetermined attack so that the attack will not affect the watermarked data.

21. The method of claim 1, wherein the data to be watermarked is represented in a transformed domain and wherein the second set of intermediate extracted values is represented in a spatial domain.

22. The method of claim 1, wherein the data to be watermarked is represented in a temporal domain.

23. The method of claim 1, wherein the second set of intermediate extracted data is represented in a transformed domain and wherein the data to be watermarked is in a different transformed domain.

24. The method of claim 23, wherein one of the transformed domains is selected from a group consisting of DCT, block DCT, FFT, block FFT, wavelet, Hadamard transform, Cortex transform.

25. The method of claim 1, wherein step (iii) is performed such that the second set of target values maximizes a measure of robust match with the watermark signal.

26. The method of claim 25, wherein the measure of robust match is determined according to the equations:

$$w'=w-\mathrm{mean}(w)$$

$$u'=u-\mathrm{mean}(u)$$

$$Ec=W'.u'/\mathrm{sqrt}(w'.w'*(u'.u'+Sn))$$

where x.y indicates the inner product of vectors x and y, w is the watermark signal, u is the second set of target values, Sn is expected noise, and Ec is expected correlation.

27. The method of claim 1, wherein the data to be watermarked is represented in spatial and temporal domains.

28. The method of claim 1, wherein the data to be watermarked is represented in a transformed domain and wherein the second set of intermediate extracted values is represented in a temporal domain.

29. The method of claim 1, wherein the data to be watermarked is represented in a transformed domain and wherein the second set of intermediate extracted values is represented in spatial and temporal domains.

30. The method of claim 1, wherein the second set of intermediate extracted data is represented in a transformed domain and wherein the data to be watermarked is in a spatial domain.

31. The method of claim 1, wherein the second set of intermediate extracted data is represented in a transformed domain and wherein the data to be watermarked is in a temporal domain.

32. The method of claim 1, wherein the second set of intermediate extracted data is represented in a transformed domain and wherein the data to be watermarked is in spatial and temporal domains.

* * * * *